March 11, 1924.

L. OLSON

SAW TOOTH SHAPER

Filed July 25, 1921

INVENTOR
Louis Olson
By Paul & Paul
His Attorneys

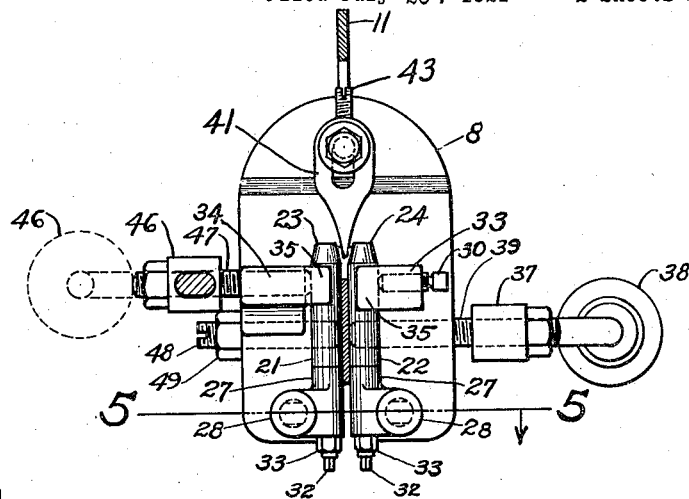
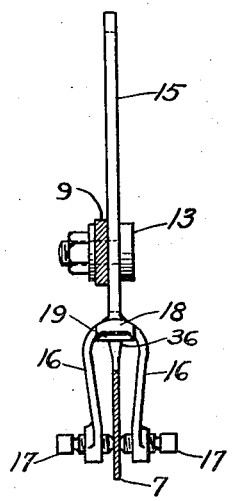
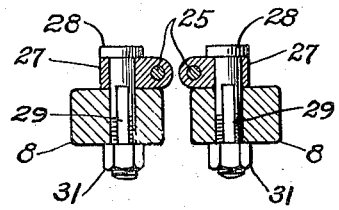
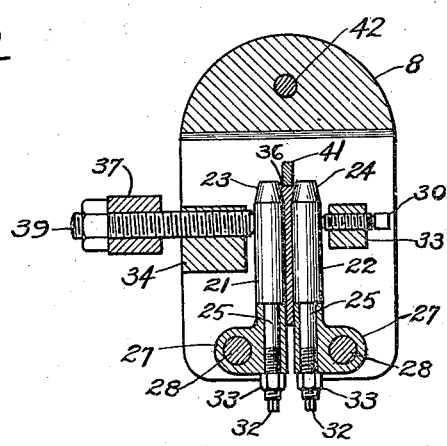

Patented Mar. 11, 1924.

1,486,157

UNITED STATES PATENT OFFICE.

LOUIS OLSON, OF MINNEAPOLIS, MINNESOTA.

SAW-TOOTH SHAPER.

Application filed July 25, 1921. Serial No. 487,354.

*To all whom it may concern:*

Be it known that I, LOUIS OLSON, a citizen of the United States, resident of Minneapolis, county of Hennepin, State of Minnesota, have invented certain new and useful Improvements in Saw-Teeth Shapers, of which the following is a specification.

This invention relates to new and useful improvements in saw-tooth shapers for saws of various kinds such as band, gang, circular, etc. This invention more particularly relates to a device for shaping to a uniform condition saw-teeth which have previously been swaged or spread as is common in this art. This novel device comprises generally a frame adapted to be secured to a saw which frame has a pair of co-operable dies adjustably mounted thereon and capable of movement toward each other to press a sawtooth into a shape uniform with that of each successively treated tooth for the selected adjustment of the dies.

The object of the invention therefore is to provide an improved saw-tooth shaper.

Other objects of the invention will more fully appear from the following description and the accompanying drawings and will be pointed out in the annexed claims.

In the drawings there has been disclosed a structure designed to carry out the objects of the invention, but it is to be understood that the invention is not confined to the exact features shown as various changes may be made within the scope of the claims which follow.

In the drawings:

Figure 3 is a section on the line 3—3 of of Figure 1;

Figure 4 is a section on the line 4—4 of Figure 1;

Figure 5 is a cross-sectional detail of the pivotal mounting of the dies; and

Figure 6 is a section on the line 6—6 of Figure 1.

Figure 1:
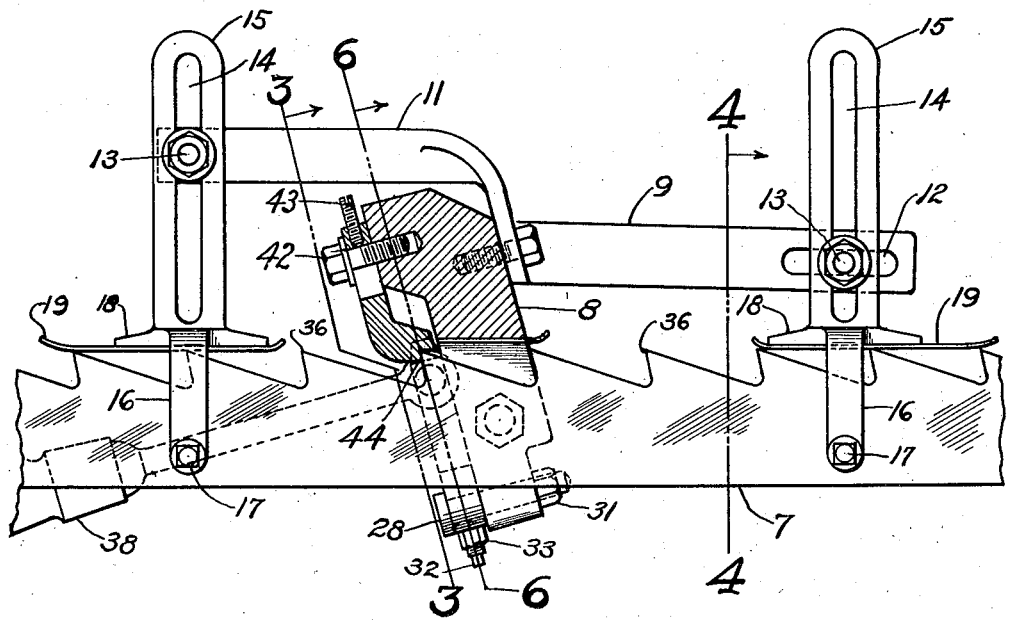
Figure 1 is a view in side elevation and partly in section of the shaper positioned upon a saw to be treated.
Figure 2:
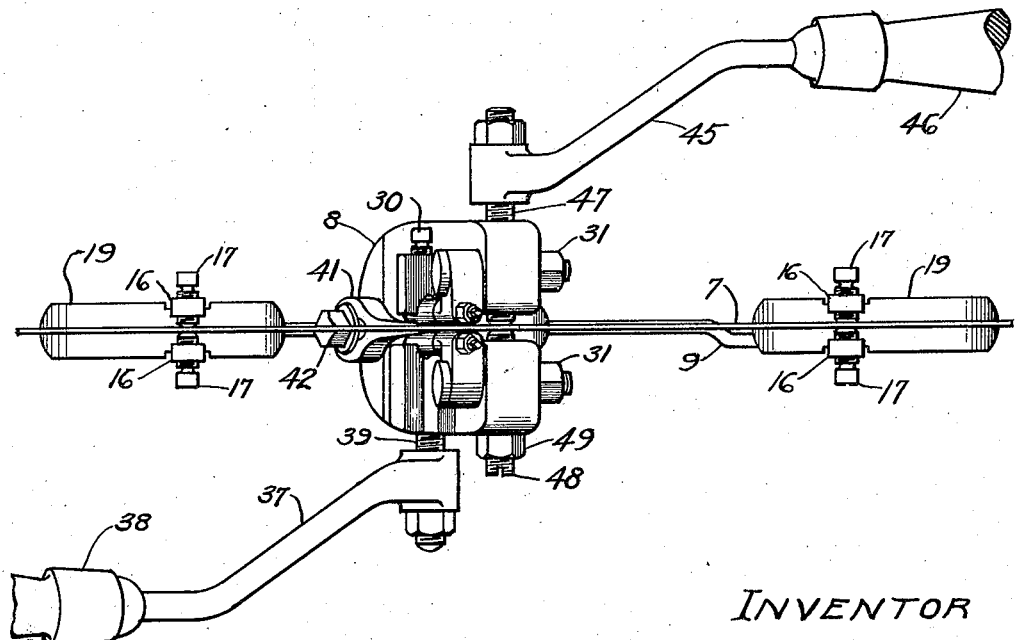
Figure 2 is a view of the under side of the positioned shaper.

In this selected embodiment of the invention the shaper is disclosed as having a suitable frame by which the device is adapted to be secured to a saw 7. The frame comprises a metallic block 8 having bolted thereto the arms 9 and 11. The arm 9 has a slot 12 adjacent its end through which is received in longitudinal adjustment, the headed bolt 13. The stem of the bolt is adapted to project through the elongated slot 14 in the clamping bar 15 which is terminally forked to provide legs 16 to straddle the saw 7. The legs carry opposed set screws 17 whereby the clamping bar 15 is held to the saw. The arm 11, preferably integral with the arm 9, is offset to pass around the end of the block 8 and terminally carries a similar headed bolt 13 projecting within the similar slot 14 of the other clamping bar 15 with its integral legs and set screws whereby this bar is likewise clamped to the saw. Each bar 15, adjacent its legs 16, is provided with a transversely extending shoulder 18. An elongated metallic plate 19 is inserted between each pair of legs and is secured to the adjacent face of the shoulder 18 as, for example, by soldering or welding. Each such plate 19 functions as a guide to be held against the tips of the adjacent saw-teeth and thereby to aid in assuring proper alinement of the frame on the saw. The frame is thus held in fixed position with relation to the saw during the treatment of the particular tooth.

The working portions of the co-operable dies are convex and tapered so that the finished saw-tooth is given a greater thickness at its front or cutting edge than at its back edge. Hence, as the tooth is reduced by wear, the front or cutting corners of the tooth will not become rounded and dull as quickly as would occur if the metal of the tooth were of uniform thickness from front to back. As here shown, such working portions of the dies are cylindrical and outwardly tapered or terminally beveled. For simplicity of construction and operation, the similar dies 21 and 22 are cylindrical and respectively provided with terminal tapered working portions 23 and 24. These co-operable dies are pivotally mounted on the block and, furthermore, to take up wear are rotatable in their pivotal mountings. While both dies may be pivotally movable during the tooth-pressing operation, it is preferred to set one of the dies in a selected adjusted relatively fixed position and to have the other die pivotally operable to press the tooth between itself and the relatively fixed die.

In this preferred construction, the dies are formed with reduced portions 25 adapted each to project through one of the similar sleeves 26 which are respectively provided with ears 27 each suitably apertured to be freely mounted upon a bolt 28. Each bolt is provided with a substantially flattened threaded stem 29 projecting through and non-rotatably held in an elongated aperture in the block 8 provided on each side of an elongated median block-slot through which the saw 7 may be passed. The nuts 31 function to hold the bolts 29 in assembled position. The reduced portions 25 of the two dies project beyond the sleeves and such projecting portions are threaded, as shown in Figure 6, and are terminally provided with angled heads 32 whereby the cylindrical dies may be rotated and thereafter held in locked position by means of the binding nuts 33.

As above noted, one of the dies is preferably held in an adjusted relatively fixed position. A pair of bosses 33 and 34 are integrally provided on the block and formed with oppositely extending lips 35 which overhang the block and terminate adjacent the median block-slot. The two cylindrical dies are respectively permitted a limited pivotal oscillatory movement to and from the recess provided by the overhanging lips. A set-screw 35 is received in threaded engagement through the boss 33 and by means of this set-screw, the die 22 may be held in the selected and adjusted set position. An example of such set position is shown in Figure 6 wherein the saw 7 is disclosed as inserted in the median slot of the block so that the usual swaged and spread tooth 36 is ready to be pressed against the tapered working portion 24 of the relatively fixed die by the tapered portion 23 of the relatively movable die 21. A crank 37, having an operating handle 38, is fast to the shaft 39 received in threaded engagement in an aperture through the boss 34 so that upon oscillation of the shaft 39 by the handle, the die 21 is forced toward the die 22 and the tooth is pressed between the co-operable tapered portions 23 and 24 and thereby shaped.

A guide having a tooth shaped detent extends over the end of the block slot adjacent the tapered die portions. The guide comprises a slotted bar 41 adjustably held in the selected position by means of the threaded bolt 42 passing through the slot in the bar and received in threaded engagement in an aperture in the block 8. Preferably to assure greater nicety of adjustment a threaded stem 43 is screwed through an aperture in the bar and terminally abuts against the bolt. The bar has a curved recessed portion 44 which extends toward the block slot and the tapered portions of the dies. As is shown in Figure 1, this recess of the curved portion 44 of the bar is shaped to receive a saw-tooth and to function as a detent therefor—to prevent further movement of the frame as it is slipped along the suitably supported saw when shaping successive saw-teeth.

While the legs 16 of the clamping bars of the frame are adapted to be held to the saw by means of the set-screws 17, the major clamping is effected by means of the crank 45, having an operating handle 46, fast on the shaft 47 received in threaded engagement through the block and adapted to project within the median slot of the block to clamp the inserted saw either against the other side of the block slot or, preferably, against the end of a threaded shaft 48 passed through the block and held in adjusted and relatively fixed position by means of the nut 49.

In operation of the device, the saw is supported in any convenient manner. The frame is placed along the saw with the saw received through the median slot of the block and with the tooth first to be treated received within the detent recess while the tips of the teeth on either side thereof are in contact with the guide plates 19. The handle 46 is then rotated to cause the inner end of the shaft 47 to abut against the saw and to hold the frame in fixed position by means of the clamping of the saw between the opposed ends of the shafts 47 and 48. The set-screws 17 may then be tightened to aid in steadying the frame during the subsequent pressing or shaping operation. The fixed die is then adjusted and thereafter the movable die is operated to force the saw-tooth between the tapered portions 23 and 24 of the co-operable dies. In the event of wear or any unevenness of the tapered portions, the die or dies may be rotated to bring a new tapered surface into operative position.

There is thus provided a simple, inexpensive constructed and efficient saw-tooth shaper which is portable, efficient and not liable to derangement.

I claim as my invention:

1. A saw-tooth shaper having a frame, means carried by the frame to attach the frame to a saw, a pair of co-operable dies mounted on the frame, said dies having convex tapered terminal working portions with their axes disposed in substantial parallelism with the plane of the saw, means to lock one die in adjusted set position, and means operable to move the other die to cause a saw-tooth to be pressed between the tapered portions and thereby to be shaped.

2. A saw-tooth shaper having a frame, means carried by the frame to attach the frame to a saw, a pair of co-operable dies mounted on the frame, said dies having tapered cylindrical terminal working portions, means to lock one die in adjusted set position, and means operable to move the other die to cause a saw-tooth to be pressed between the cylindrical die portions and thereby to be shaped.

3. A saw-tooth shaper having a frame, means carried by the frame to attach the frame to a saw, a pair of co-operable cylindrical dies mounted on the frame, said dies having tapered terminal working portions, means to lock one die in adjusted set position, and means operable to move the other die to cause a saw-tooth to be pressed between the tapered working portions and thereby to be shaped.

4. A saw-tooth shaper having a frame, means carried by the frame to attach the frame to a saw, a pair of co-operable cylindrical dies, said dies being rotatably and pivotally mounted on the frame and having tapered terminal working portions, means to lock each die against rotation in a rotatably adjusted position, means to lock one die against pivotal movement in a pivotally adjusted position, and means operable pivotally to move the other die to cause a saw-tooth to be pressed between the cylindrical dies and thereby to be shaped.

5. A saw-tooth shaper having a frame, means carried by the frame to attach the frame to a saw, a pair of sleeves pivotally mounted on the frame, a pair of co-operable cylindrical dies each rotatably mounted in one sleeve, means to lock each die against rotation in a rotatably adjusted position, means to lock one die against pivotal movement in a pivotally adjusted position, and means operable pivotally to move the other die to cause a saw-tooth to be pressed between the cylindrical dies and thereby to be shaped.

In witness whereof, I have hereunto set my hand this 13th day of July, 1921.

LOUIS OLSON